US010635335B2

(12) United States Patent
Grossman et al.

(10) Patent No.: US 10,635,335 B2
(45) Date of Patent: Apr. 28, 2020

(54) STORAGE SYSTEM AND METHOD FOR EFFICIENT PIPELINE GAP UTILIZATION FOR BACKGROUND OPERATIONS

(71) Applicant: Western Digital Technologies, Inc., San Jose, CA (US)

(72) Inventors: Yuval Grossman, Kiryat Ono (IL); Alexander Bazarsky, Holon (IL); Tomer Eliash, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 46 days.

(21) Appl. No.: 16/014,502

(22) Filed: Jun. 21, 2018

(65) Prior Publication Data

US 2018/0314448 A1 Nov. 1, 2018

Related U.S. Application Data

(63) Continuation-in-part of application No. 15/911,815, filed on Mar. 5, 2018, which is a continuation-in-part (Continued)

(51) Int. Cl.
   *G06F 3/06* (2006.01)
   *G06F 15/76* (2006.01)
   *G06F 12/02* (2006.01)

(52) U.S. Cl.
   CPC ............ *G06F 3/0629* (2013.01); *G06F 3/064* (2013.01); *G06F 3/0608* (2013.01); (Continued)

(58) Field of Classification Search
   CPC ...... G06F 3/0629; G06F 3/0625; G06F 3/064; G06F 3/0679
   See application file for complete search history.

(56) References Cited

U.S. PATENT DOCUMENTS 5,691,948 A 11/1997 Sakabe
7,360,064 B1 * 4/2008 Steiss .................... G06F 9/3802
712/214
(Continued)

FOREIGN PATENT DOCUMENTS

WO    WO 2010/080172 A1    7/2010

OTHER PUBLICATIONS

U.S. Appl. No. 14/803,732, filed Jul. 20, 2015, Tzafrir et al.
(Continued)

*Primary Examiner* — Mano Padmanabhan
*Assistant Examiner* — Andrew J Cheong
(74) *Attorney, Agent, or Firm* — Dickinson Wright PLLC; Steven Hurles

(57) ABSTRACT

A storage system and method for adaptive scheduling of background operations are provided. In one embodiment, after a storage system completes a host operation in the memory, the storage system remains in a high power mode for a period of time, after which the storage system enters a low-power mode. The storage system estimates whether there will be enough time to perform a background operation in the memory during the period of time without the background operation being interrupted by another host operation. In response to estimating that there will be enough time to perform the background operation in the memory without the background operation being interrupted by another host operation, the storage system performs the background operation in the memory.

20 Claims, 14 Drawing Sheets

Related U.S. Application Data of application No. 15/465,367, filed on Mar. 21, 2017.

(52) U.S. Cl.
CPC .......... *G06F 3/0659* (2013.01); *G06F 3/0679* (2013.01); *G06F 12/0238* (2013.01); *G06F 15/76* (2013.01); *G06F 3/0625* (2013.01); *G06F 2212/7201* (2013.01); *G06F 2212/7202* (2013.01); *G06F 2212/7205* (2013.01)

(56) References Cited

U.S. PATENT DOCUMENTS

| | | | |
|---|---|---|---|
| 7,383,457 | B1 | 6/2008 | Knight |
| 7,441,101 | B1* | 10/2008 | Steiss .................... G06F 9/3802 712/205 |
| 7,996,642 | B1 | 8/2011 | Smith |
| 8,032,724 | B1 | 10/2011 | Smith |
| 8,364,918 | B1* | 1/2013 | Smith ................. G06F 12/0246 711/159 |
| 8,843,712 | B1 | 9/2014 | Smith |
| 9,405,344 | B1 | 8/2016 | Rosen |
| 9,569,352 | B2 | 2/2017 | Marcu et al. |
| 2005/0198542 | A1 | 9/2005 | Freker et al. |
| 2006/0259791 | A1 | 11/2006 | Dockser |
| 2007/0008805 | A1 | 1/2007 | Jung et al. |
| 2008/0034174 | A1 | 2/2008 | Traister et al. |
| 2009/0254499 | A1 | 10/2009 | Deyo |
| 2010/0042811 | A1* | 2/2010 | Peled ................. G06F 9/30094 712/205 |
| 2010/0169588 | A1 | 7/2010 | Sinclair |
| 2012/0151238 | A1 | 6/2012 | Yang |
| 2012/0159209 | A1 | 6/2012 | Stemen et al. |
| 2013/0100849 | A1 | 4/2013 | Szabo et al. |
| 2013/0138867 | A1 | 5/2013 | Craft et al. |
| 2013/0173875 | A1 | 7/2013 | Kim et al. |
| 2013/0290758 | A1 | 10/2013 | Quick et al. |
| 2014/0032817 | A1 | 1/2014 | Bux et al. |
| 2014/0047169 | A1 | 2/2014 | Seo et al. |
| 2014/0115239 | A1 | 4/2014 | Kong et al. |
| 2014/0269127 | A1 | 9/2014 | Hung et al. |
| 2015/0026413 | A1 | 1/2015 | Meier et al. |
| 2015/0121106 | A1 | 4/2015 | Eckert et al. |
| 2015/0169443 | A1 | 6/2015 | Lee |
| 2015/0347029 | A1 | 12/2015 | Kotte et al. |
| 2015/0347030 | A1 | 12/2015 | Mathur et al. |
| 2015/0347040 | A1 | 12/2015 | Mathur et al. |
| 2015/0347041 | A1 | 12/2015 | Kotte et al. |
| 2015/0358286 | A1 | 12/2015 | Raffill et al. |
| 2016/0092114 | A1 | 3/2016 | Zhang et al. |
| 2016/0210228 | A1* | 7/2016 | Tandel ................ G06F 12/0253 |
| 2016/0335179 | A1 | 11/2016 | Lee et al. |
| 2016/0350214 | A1 | 12/2016 | Payer et al. |
| 2016/0357480 | A1 | 12/2016 | Choi |
| 2017/0024002 | A1 | 1/2017 | Tzafrir et al. |
| 2017/0109101 | A1 | 4/2017 | Hanson et al. |
| 2017/0329710 | A1* | 11/2017 | Krause ................ G06F 12/0848 |
| 2018/0077236 | A1 | 3/2018 | Nikura et al. |

OTHER PUBLICATIONS

U.S. Appl. No. 15/465,367, filed Mar. 21, 2017, Navon et al.
U.S. Appl. No. 15/911,815, filed Mar. 5, 2018, Hahn et al.
Non-Final Office Action in U.S. Appl. No. 15/465,367 dated Jul. 3, 2018, 24 pages.
Non-Final Office Action in U.S. Appl. No. 15/911,815 dated Jul. 5, 2018, 19 pages.
Notice of Allowance in U.S. Appl. No. 14/803,732 dated Jun. 1, 2018, 8 pages.
Notice of Allowance in U.S. Appl. No. 14/803,732 dated Jul. 9, 2018, 2 pages.
International Search Report and Written Opinion in corresponding International Application No. PCT/US2016/036354, dated Sep. 5, 2016, 13 pages.
Non-Final Rejection from U.S. Appl. No. 14/803,732 dated Jan. 12, 2017, pp. 1-12.
Final Rejection from U.S. Appl. No. 14/803,732 dated May 4, 2017, pp. 1-8.
Non-Final Rejection from U.S. Appl. No. 14/803,732 dated Sep. 6, 2017, pp. 1-8.

\* cited by examiner

STORAGE SYSTEM AND METHOD FOR EFFICIENT PIPELINE GAP UTILIZATION FOR BACKGROUND OPERATIONS

CROSS-REFERENCE TO RELATED APPLICATION

This application is a continuation-in-part of U.S. patent application Ser. No. 15/911,815, filed Mar. 5, 2018, which is a continuation-in-part of U.S. patent application Ser. No. 15/465,367, filed Mar. 21, 2017, both of which are hereby incorporated by reference.

BACKGROUND

A storage system can have a memory that is organized into blocks. Over time, data written in a block can be invalidated (e.g., because of host data deletion and/or data transfers internal to the storage system). Garbage collection is a process that collects the valid parts of used memory blocks (ignoring the invalidated parts) and moves them to a new block. When a block is fully invalidated, it is returned to the free block pool. Garbage collection can be controlled by keeping a "valid counter" for each block to track the number of valid flash management units in the block and/or by a program/erase cycle counter to monitor the block's endurance. A garbage collection algorithm can choose which block should be "collected" next by checking which block has the lowest "valid counter," the highest program/erase cycle counter, and/or a program/erase cycle counter that is below average.

DETAILED DESCRIPTION

Figure 1A:
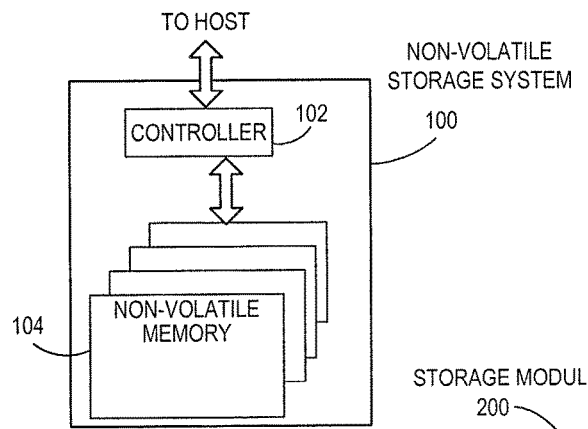
FIG. 1A is a block diagram of a non-volatile storage system of an embodiment.

By way of introduction, the below embodiments relate to a storage system and method for predictive block allocation for efficient garbage collection. In one embodiment, a method for block allocation is provided. The method comprises determining whether a memory in a storage system is being used in a first usage scenario or a second usage scenario; in response to determining that the memory is being used in the first usage scenario, using a first block allocation method; and in response to determining that the memory is being used in the second usage scenario, using a second block allocation method, wherein the first block allocation method allocates blocks that are closer to needing garbage collection than the second block allocation method.

In some embodiments, the determining is performed by comparing a plurality of write commands to patterns stored in the storage system, wherein the first block allocation method is associated with one of the patterns, and wherein the second block allocation method is associated with another one of the patterns.

In some embodiments, the determining is performed using machine learning. In some embodiments, the machine learning uses supervised learning, whereas, in other embodiments, the machine learning uses unsupervised learning.

In some embodiments, the determining is performed by calculating a ratio of user single address updates versus drive rewrites.

In some embodiments, the determining is performed by receiving an indication from a host as to whether the memory is being used in the first usage scenario or in the second usage scenario.

In some embodiments, the method further comprises altering a time of garbage collection.

In some embodiments, the time of garbage collection is altered by adjusting at least one threshold parameter for initiating garbage collection.

In some embodiments, the time of garbage collection is altered by altering a ratio of triggering garbage collection operations versus host write.

In some embodiments, the time of garbage collection is altered by altering a ratio of dynamic versus static garbage collection operations.

In some embodiments, data stored in the first usage scenario is updated less frequently than data stored in the second usage scenario.

In some embodiments, the memory comprises a three-dimensional memory.

In some embodiments, the method is performed in the storage system.

In another embodiment, a storage system is provided comprising a memory and a controller. The controller is configured to receive a plurality of write commands; compare the plurality of write commands to patterns stored in the storage system; for each pattern, generate a score that represents a matching level of the plurality of write commands to that pattern; determine which score exceeds a threshold; and choose a block allocation scheme associated with the pattern whose score exceeds the threshold.

In some embodiments, a block allocation scheme associated with a first pattern allocates blocks that are closer to needing garbage collection than a block allocation scheme associated with a second pattern.

In some embodiments, the controller is further configured to adjust at least one threshold parameter for initiating garbage collection.

In some embodiments, the memory comprises a three-dimensional memory.

In some embodiments, the storage system is embedded in a host.

In some embodiments, the storage system is removably connected to a host.

In another embodiment, a storage system is provided comprising a memory; means for determining how the memory is being used; and means for choosing a block allocation method based on how the memory is being used, wherein a first block allocation method is chosen in response to determining that the memory is being used in a first usage scenario, and wherein a second block allocation method is chosen in response to determining that the memory is being used in a second usage scenario, further wherein the first block allocation method allocates blocks that are closer to needing garbage collection than the second block allocation method.

In some embodiments, the means for determining and the means for choosing comprise a controller.

In some embodiments, the memory comprises a three-dimensional memory.

In another embodiment, a method for adaptive scheduling of a background operation is provided that is performed in a storage system in communication with a host, wherein the storage system is configured to operate in a high power mode and a low power mode and comprises a memory. The method comprises completing a host operation in the memory, wherein the storage system is in the high power mode when performing the host operation and remains in the high power mode for a period of time following the completion of the host operation, after which the storage system enters the low-power mode; estimating whether there will be enough time to perform a background operation in the memory during the period of time without the background operation being interrupted by another host operation; and in response to estimating that there will be enough time to perform the background operation in the memory without the background operation being interrupted by another host operation, performing the background operation in the memory.

In some embodiments, the storage system estimates whether there will be enough time by comparing write commands received from the host to patterns stored in the storage system, wherein a matching pattern provides a prediction of how long it will be before another host operation will be received.

In some embodiments, the method further comprises generating a score for each pattern stored in the storage system that represents a matching level to the received write commands; comparing the scores against a threshold; and selecting a pattern that satisfies the threshold.

In some embodiments, the storage system uses machine learning to perform the estimating.

In some embodiments, the memory comprises a three-dimensional memory.

In some embodiments, the storage system is embedded in the host.

In some embodiments, the storage system is removably connected to the host.

In another embodiment, a storage system is provided comprising a memory and a controller in communication with the memory. The controller is configured to enter a high power mode to perform a foreground operation; remain in the high power mode during a latency margin after the foreground operation is performed; and predict whether there is enough time remaining in the latency margin to perform a background operation before another foreground operation needs to be performed.

In some embodiments, the controller is configured to perform the predicting by comparing a pattern of write commands received from a host to a stored plurality of patterns of write commands.

In some embodiments, the plurality of patterns of write commands are stored in the storage system when the storage system is off-line with respect to the host.

In some embodiments, the controller is further configured to score each of the stored plurality of patterns of write commands against the pattern of write commands received from the host to determine a match.

In some embodiments, the controller is configured to use machine learning to perform the predicting.

In some embodiments, the memory comprises a three-dimensional memory.

In some embodiments, the storage system is embedded in a host.

In some embodiments, the storage system is removably connected to a host.

In another embodiment, a storage system is provided comprising a memory; means for determining whether the storage system should perform a background operation while the storage system is still in a high power mode after performing a host command, wherein the storage system is in the high power mode for a predetermined period of time prior to entering a low power mode; and means for performing the background operation in response to determining that the storage system should perform the background operation.

In some embodiments, the means for determining uses pattern matching.

In some embodiments, the means for determining uses machine learning.

In some embodiments, the means for determining predicts whether the host will send a command that will interrupt performance of the background operation.

In some embodiments, the memory comprises a three-dimensional memory.

In another embodiment, a method for performing a background operation is provided. The method is performed in a controller of a storage system in communication with a host, wherein the controller comprises a plurality of hardware stages, wherein only a subset of the hardware stages is used in performing a background operation. The method comprises performing first and second host operations in a pipeline manner using the plurality of hardware stages; and performing a background operation using the subset of hardware stages after the first host operation finishes using the subset of hardware stages but before the second host operation uses the subset of hardware stages.

In some embodiments, the background operation is performed when at least one of the hardware stages is being used to perform the second host operation.

In some embodiments, the method further comprises selecting the background operation from a plurality of background operations.

In some embodiments, the selection is based on at least one of the following: latency time, hardware stages needed, and whether the background operation is suspendable or atomic.

In some embodiments, the storage system comprises a three-dimensional memory in communication with the controller.

In some embodiments, the storage system is embedded in the host.

In some embodiments, the storage system is removably connected to the host.

In another embodiment, a storage system is provided comprising a memory; and a controller configured to: perform a plurality of host operations, wherein the storage system is in a high power mode while performing the plurality of host operations, after which the storage system enters a low-power mode; and perform a background operation while the storage system is in the high-power mode.

In some embodiments, the controller comprises a plurality of hardware stages, wherein only a subset of the hardware stages is used in performing the background operation, and wherein the background operation is performed using the subset of hardware stages after a first one of the plurality of operations finishes using the subset of hardware stages but before a second one of the plurality of host operations uses the subset of hardware stages.

In some embodiments, the background operation is performed when at least one of the hardware stages is being used to perform the second one of the plurality of host operations.

In some embodiments, the controller is further configured to select the background operation from a plurality of background operations.

In some embodiments, the selection is based on at least one of the following: latency time, hardware stages needed, and whether the background operation is suspendable or atomic.

In some embodiments, the memory comprises a three-dimensional memory.

In some embodiments, the storage system is embedded in a host.

In some embodiments, the storage system is removably connected to a host.

In another embodiment, a storage system is provided comprising: a memory; means for performing first and second host operations in a pipeline manner using a plurality of hardware stages, wherein the storage system is in a high power mode when performing first and second host operations, and, wherein the storage system remains in the high power mode for a period of time following completion of the second host operation, after which the storage system enters a low-power mode; and means for performing a background operation using the subset of hardware stages after the first host operation finishes using the subset of hardware stages but before the second host operation uses the subset of hardware stages, wherein the background operation is performed when the storage system is in the high power mode before the second host operation finishes.

In some embodiments, the storage system further comprises means for selecting the background operation from a plurality of background operations based on at least one of the following: latency time, hardware stages needed, and whether the background operation is suspendable or atomic.

In some embodiments, the memory comprises a three-dimensional memory.

In some embodiments, the storage system is embedded in a host.

In some embodiments, the storage system is removably connected to a host.

In another embodiment, a storage system is provided comprising a controller comprising a plurality of hardware stages; and a memory storing classification information of a plurality of background operations, wherein each background operation is classified by a hardware stage in the controller used to perform the background operation. The controller is configured to select one of the plurality of background operations to perform based on which hardware stages in the controller are available.

In some embodiments, the controller is further configured to prioritize the plurality of background operations, and wherein the controller is further configured to select the one of the plurality of background operations to perform based both on which hardware stages in the controller are available and on the prioritization of the plurality of background operations.

In some embodiments, the memory comprises a three-dimensional memory.

Other embodiments are possible, and each of the embodiments can be used alone or together in combination. Accordingly, various embodiments will now be described with reference to the attached drawings.

Figure 1B:
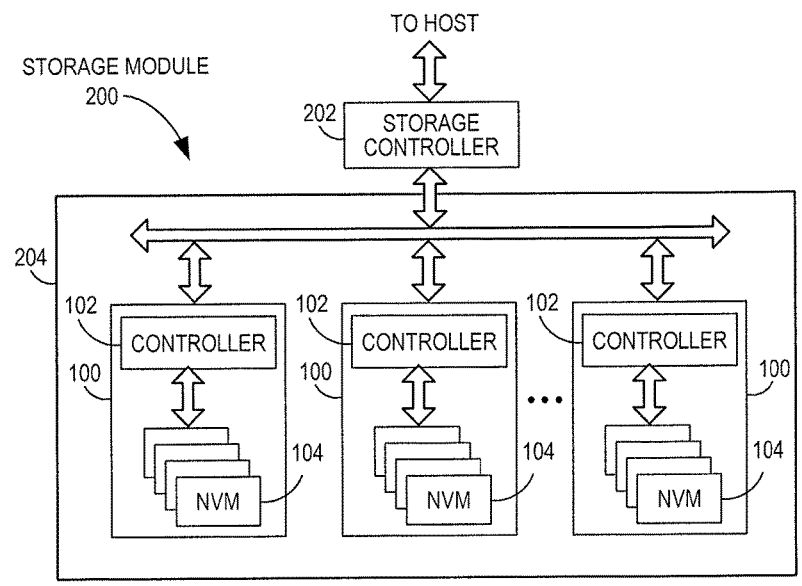
FIG. 1B is a block diagram illustrating a storage module of an embodiment.
Figure 1C:
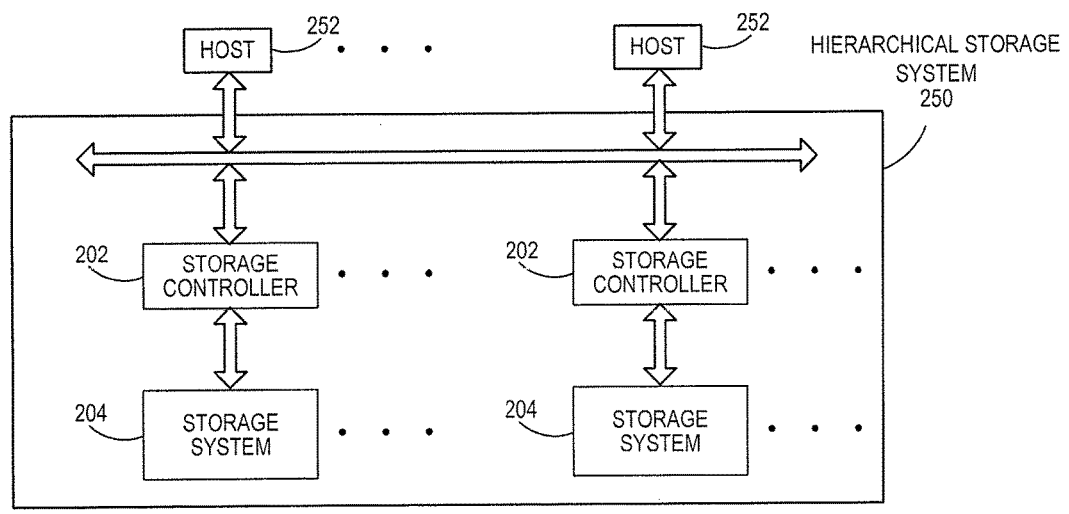
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
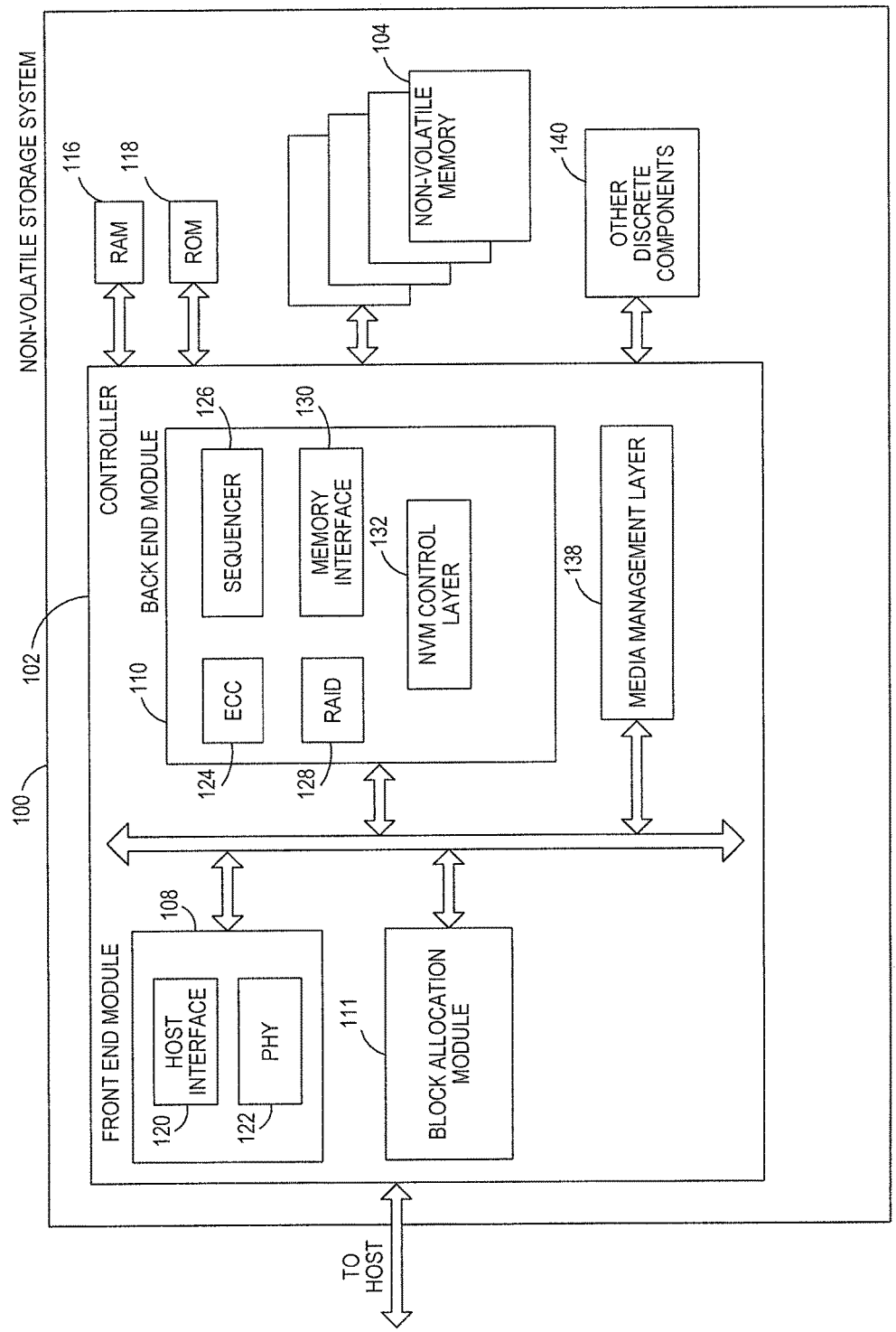
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a block allocation module 111, which is discussed in more detail below, and can be implemented in hardware or software/firmware. Also, as will become clear from the below, the controller 102, along with a hardware and/or software configuration to perform the algorithms discussed herein and shown in the drawings, can provide means for predicting usage behavior of the memory and means for allocating a block based on the predicted usage behavior.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
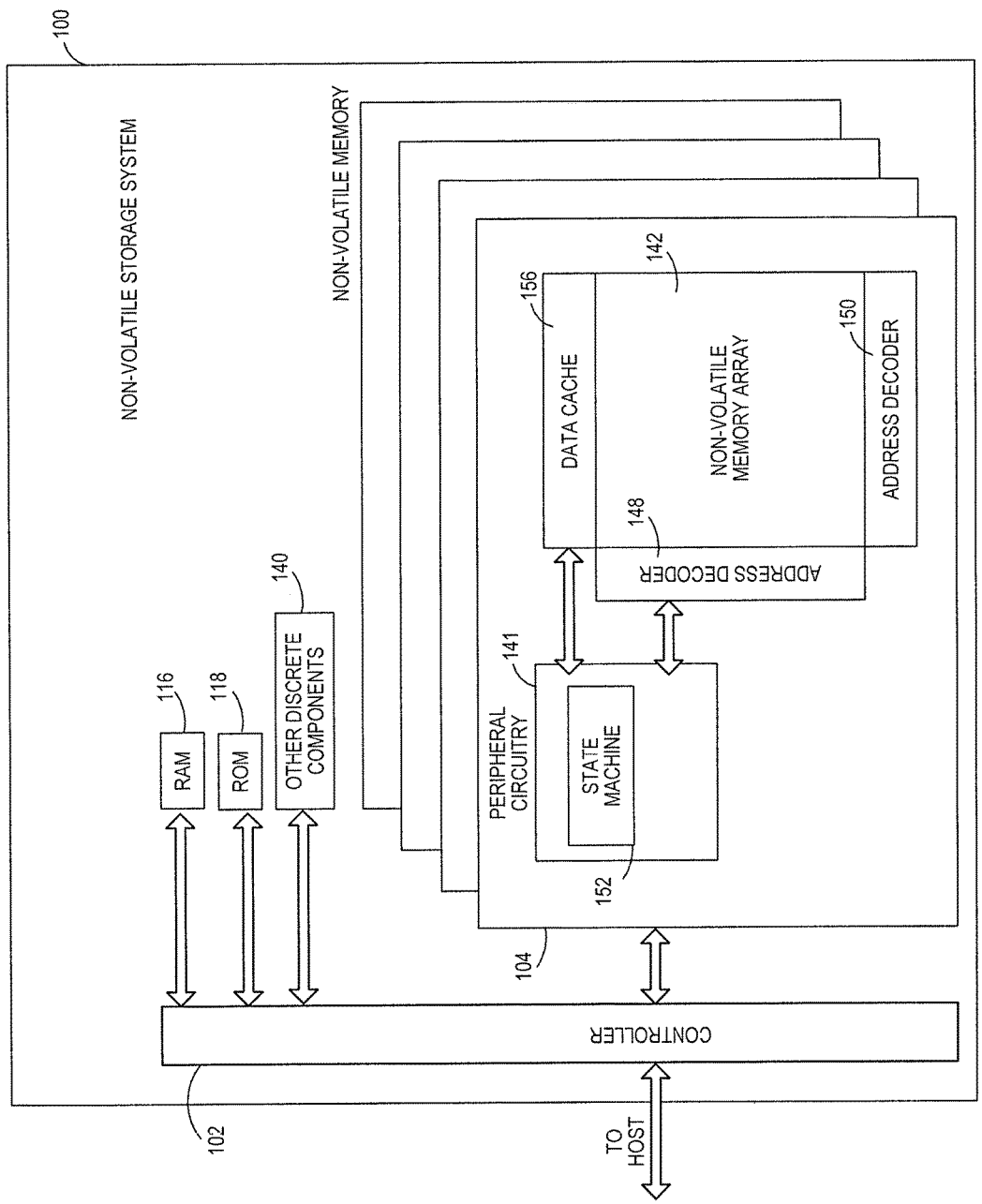
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to the controller 102. Non-volatile memory die 104 further includes a data cache 156 that caches data.

As mentioned above, a storage system can have a memory that is organized into blocks. (As used herein, a block is a set of memory cells.) Over time, data written in a block can be invalidated (e.g., because of host data deletion and/or data transfers internal to the storage system). Garbage collection is a process that collects the valid parts of used memory blocks (ignoring the invalidated parts) and moves them to a new block. When a block is fully invalidated, it is returned to the free block pool. Garbage collection can be controlled by keeping a "valid counter" for each block to track the number of valid flash management units in the block and/or by a program/erase cycle counter to monitor the block's endurance. A garbage collection algorithm can choose which block should be "collected" next by checking which block has the lowest "valid counter," the highest program/erase cycle counter, and/or a program/erase cycle counter that is below average.

Garbage collection may hinder host performance as it uses the interface from the storage system's controller to the memory and also uses space in both the storage system's controller and memory. Efficient garbage collection, both in terms of memory and performance, is very useful. The following embodiments provide a method for predicting usage behavior and choosing a block allocation method that will effectively alter garbage collection. That is, these embodiments can use the predicted behavior of a user or host in the process of choosing the next block to allocate and/or in the process of choosing the garbage collection schedule. By using adaptive block allocation in the process of garbage collection, based on the usage scenario of current device, these embodiments can be used to provide a more-efficient approach than prior designs.

Figure 3:
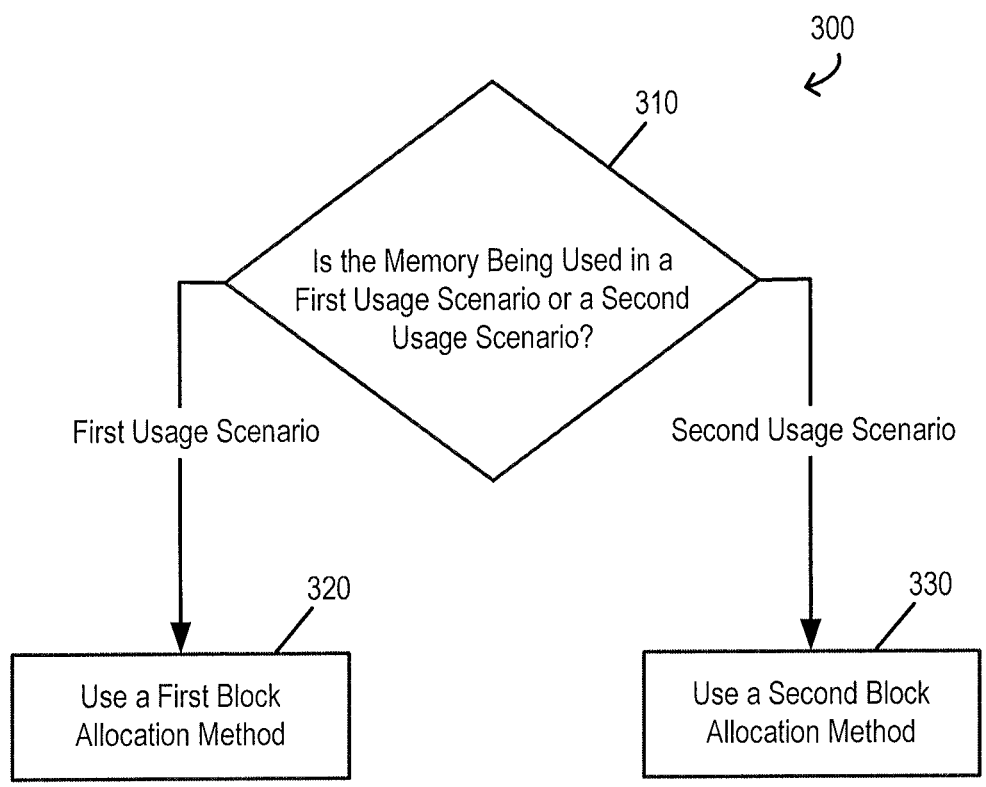
FIG. 3 is a flow chart of a method for predictive block allocation for efficient garbage collection of an embodiment.

Turning now to the drawings, FIG. 3 is a flow chart 300 of a method of an embodiment for predictive block allocation for efficient garbage collection. As shown in FIG. 3, in this embodiment, the storage system 100 (e.g., the controller 102 or the block allocation module 111) determines whether the memory is being used in a first usage scenario or a second usage scenario (act 310). In response to determining that the memory 104 is being used in the first usage scenario, the storage system 100 uses a first block allocation method (act 320). Conversely, in response to determining that the memory 104 is being used in the second usage scenario, the storage system 100 uses a second block allocation method (act 330). In one embodiment, data stored in the first usage scenario is updated less frequently than data stored in the second usage scenario, and the first block allocation method allocates blocks that are closer to needing garbage collection than the second block allocation method. In one embodiment, one block can be closer to needing garbage collection than another block if that block has a parameter (e.g., a value of a valid flash management unit (FMU) counter and/or a program/erase cycle counter) that is closer to the threshold for initiating garbage collection.

For example, there can be a clear distinction between block allocation for storage systems/memories that are used for streaming videos (extreme use case: where the entire memory 104 (e.g., flash drive) is written and then rewritten immediately, time after time) and storage systems/memories that are used for updating something online (use case: where the same logical block address (LBA) is written over and over again, such as when written a log file, doing maintenance, or performing a single address update). In the first usage scenario (drive rewrite), block allocation can be done in a more "conservative" fashion since all the data is valid, and there is no system gain of releasing blocks by garbage collection operations. However, in the second usage scenario, block allocation can be done in a more "aggressive" fashion since only few flash management units (FMUs) are valid, and there is high incentive to revive blocks fast by garbage collection operations.

So, data written in the first usage scenario (e.g., "cold storage") can be allocated to blocks that are close to their garbage-collection-initiation threshold (e.g., blocks with a high program-erase cycle (PEC) counter). Even though the blocks are close to their garbage-collection-initiation threshold, because the data will not be re-written (or have a limited number of re-writes), there is a low chance that the blocks will need garbage collection in the near term. Plus, these types of blocks would not be ideal for situations where there are multiple re-writes (the second usage scenario) because frequent re-writes to blocks that are close to their garbage-collection-initiation threshold will trigger garbage collection, which may not be preferred, as discussed above.

In contrast, data written in the second usage scenario (e.g., "many rewrites") can be allocated to blocks that are farther away from their garbage-collection-initiation threshold (e.g., blocks with a low program-erase cycle (PEC) counter or a block that has been freshly garbage collected or has garbage collected ahead of schedule). Such blocks are better suited for data that will be re-written than blocks that are closer to their garbage-collection-initiation threshold (e.g., blocks with a high program-erase cycle (PEC) counter), as such blocks can withstand more re-writes before reaching the garbage-collection-initiation threshold.

As can be seen from these examples, choosing a block allocation method based on predicted usage behavior effectively alters when garbage collection takes place, since whether an allocated block is relatively closer to or farther away from needing garbage collection affects when garbage collection on that block occurs. As noted above, garbage collection may hinder host performance as it uses the interface from the storage system's controller 102 to the memory 104 and also uses space in both the storage system's controller 102, memory 104, and/or RAM 116. Using block allocation based on usage behavior can provide efficient garbage collection, both in terms of memory and performance. These embodiments can also reduce the memory over-provisioning needed for efficient garbage collection operations, as the overall number of allocated blocks throughout the storage system's lifetime can be lower for the same data input. These embodiments can also increase endurance and performance when the memory 104 is full.

While only two usage scenarios were discussed in the above example, it should be noted that there can be many usage scenarios in between these. In one embodiment, the storage system 100 is configured to dynamically set the block allocation scheme between "conservative" and "aggressive" based on the user's behavior or usage scenario.

There are many alternatives that can be used with these embodiments. For example, the determination of whether the memory 104 is being used in a first usage scenario or a second usage scenario (or any number of usage scenarios) can be done in any suitable way. For example, in one embodiment, the determining is performed by receiving an indication from a host as to whether the memory 104 is being used in the first usage scenario or in the second usage scenario. In another embodiment, the determining is performed by the storage system 100 (e.g., with the controller 102 being programed with an algorithm that decides whether the storage system 100/memory 104 is being used in a first usage scenario, a second usage scenario, etc., or neither/none of them. For example, in one embodiment, the controller 102 compares a plurality of write commands to patterns stored in the storage system 100. This example will be discussed in more detail in conjunction with FIGS. 4 and 5.

Figure 4:
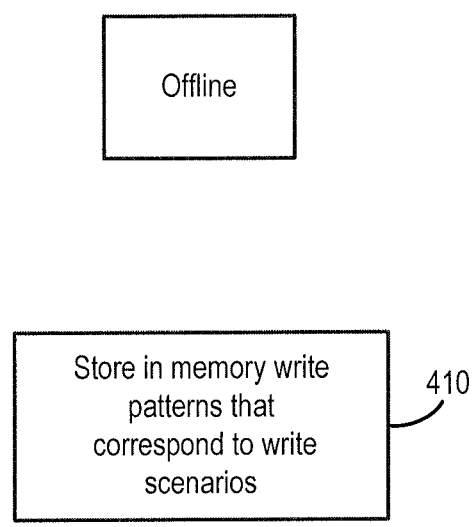
FIG. 4 is a flow chart of a method for storing patterns in a memory of an embodiment.

As shown in FIG. 4, the write patterns corresponding to various write scenarios can be stored in memory 104 (or in another storage location (e.g., ROM 118) in the storage system 100) when the storage system 100 is offline (e.g., during production, but, in one embodiment, the stored pattern can be updated during the life of the storage module 100) (act 410). For example, a number (N) of patterns can be stored that embody the patterns that optimized block allocation may be related to (e.g., a first block allocation method can be associated with one of the patterns, and a second block allocation method can be associated with another one of the patterns). A successful classification to a pattern can result in block allocation optimization for that pattern. These patterns can include, for example, logical block addresses (LBAs) or LBA ranges that a user is expected to write for a given usage scenario. The LBA write history of the user/host can be recorded and can be matched against each of the stored patterns.

Figure 5:
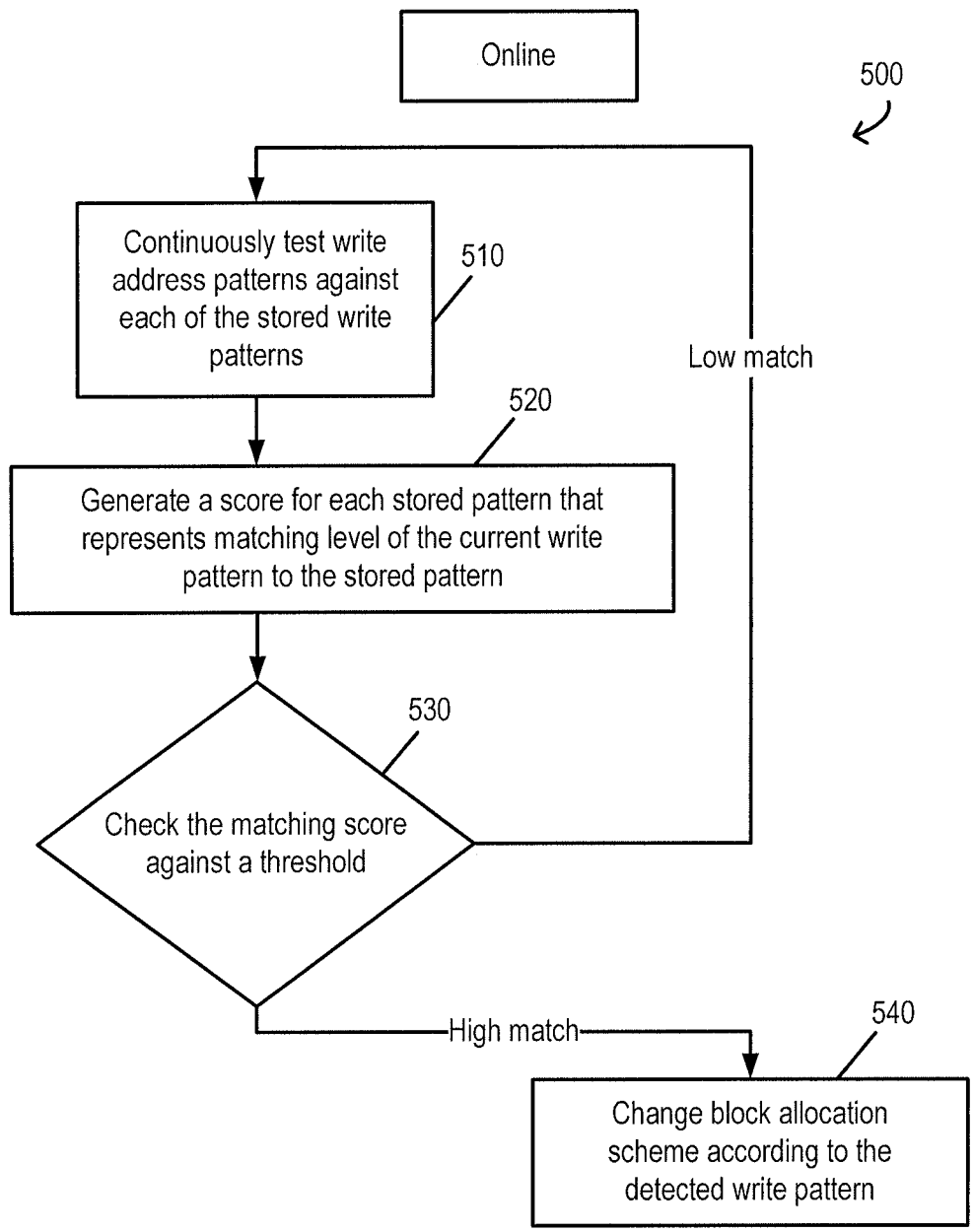
FIG. 5 is a flow chart of a method for predictive block allocation for efficient garbage collection of an embodiment in which pattern matching is used.

FIG. 5 is a flow chart 500 of a method of one embodiment that matches write addresses from write commands received by the storage system 100 against write address patterns stored in the storage system 100. In this embodiment, the acts in this flow chart 500 are performed when the storage system 100 is online. As shown in FIG. 5, in this embodiment, the storage system 100 (e.g., the controller 102 or the block allocation module 111) continuously tests write address patterns from a plurality of write commands received by the storage system 100 against patterns stored in the storage system 100 (act 510). The storage system 100 then generates a score for each stored pattern that represents a matching level of the current write pattern to the stored pattern (act 520). So, for each of the stored patterns, a score that represents the pattern's matching to the user write history is generated. The storage system 100 then checks the matching score against a threshold (act 530). If there is a low match, the process begins again at act 510. However, if there is a high match, the storage system 100 changes the block allocation scheme according to the detected write pattern (act 540). Accordingly, if one of the scores passes a certain threshold, then a successful match is declared. So, for example, if one of the patterns depicts constantly writing the same small range of LBAs, and a user is constantly writing 1 LBA (or a range of <100 LBAs), this pattern can be identified, and the indication can be passed to the block allocation unit, which will then act according to the "single address rewrite" usage scenario discussed above.

It should be noted that the above algorithm was just an example, and other algorithms and methods can be used. Further, many other alternatives can be used with these embodiments. For example, in addition to or as an alternative to the matching process discussed above, a "soft" measure, which can represent the pattern's matching to the user history, can be generated and used in the block allocation process, for example, by predicting of usage behavior using machine learning. In this alternative, a machine learning algorithm can be used for learning the user's access patterns and, accordingly, make the decision on the garbage collection policy (e.g., aggressive versus conservative schemes). The pattern recognition may be performed using a support vector machine (SVM) classification, a neural network, or other clustering methods, such as K-Means and/or the principal component analysis (PCA) method. Supervised (pre-calibrated) or unsupervised learning algorithms can be used (i.e., the training/calibration of the algorithm can be done with or without a labeled dataset that includes ground truth labels of relevant training examples (or even without pre-training/calibration of the model, where classifying is done directly (adaptive learning) during the life time of the device). As yet another example, the storage system 100 can predict usage behavior by calculating a ratio of the single address updates versus drive rewrites and, accordingly, adapt the ratio of triggering garbage collection operations versus host writes and/or the ratio of dynamic versus static garbage collection operations. Further, instead of the storage system 100 doing the predicting, the host can do the predicting and send an indication of the results to the storage system 100.

Further, in addition to or instead of allocating blocks based on usage behavior, the storage system 100 can alter the time of garbage collection initialization by adjusting at least one threshold parameter for initiating garbage collection in a block of memory 104. Examples of threshold parameters include, but are not limited to, a number of valid units in the block and a number of program/erase cycles performed in the block. As another example, the time of garbage collection initialization can be altered by performing garbage collection in a block ahead of schedule (e.g., in response to predicting that data to be stored in the block will have frequent updates).

In some of the above embodiments, the scheme of block allocation for garbage collection was determined according to an estimation of the user's inclination to frequently overwrite data. In another embodiment, a similar estimation mechanism can be used to provide a solution to a different problem; namely, using an estimation mechanism for adaptive scheduling of background operations during the time in which a user power mode requires minimum excess power. For example, in one embodiment, a storage system can use machine learning to determine whether the host/user will remain in high power mode for the duration of any of the background operations currently queued. Other embodiments are presented below.

As used herein, a background operation is in contrast to a foreground (or host/user) operation, which is an operation that is preferably performed to completion without being interrupted and typically has a predetermined completion time. A foreground command is typically issued by the host controller and sent to the storage system 100 for execution. Examples of a foreground command include, but are not limited to, a read command, a write command, and an erase command.

A background command can be performed whenever possible when no host foreground commands are currently being executed and after a period of idle time. Examples of background operations include, but are not limited to, garbage collection, read threshold calibration, time tag split or union, relocation of data to multi-level cells (such as a triple-level cell (TLC) or a quad-level cell (QLC)), data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). In some embodiments, a background operation can be preempted/interrupted by a foreground command and continued at a later time. Unlike foreground commands which can have a predetermined completion time, some background commands can have an uncertain completion time, depending on how much they are interrupted by foreground commands.

The power that is drawn from a power source of the storage system for a background management operation can take a significant portion of the storage system's power budget. Accordingly, the timing of these background operations is important for good power management. Good power management can be especially important with devices that contain embedded memory and in client/user storage devices. The power supply can play an important role in these devices, and, as these devices become smaller, their power supplies also become smaller, and the power limitations become stricter.

The storage system 100 in this embodiment is configured to work in a high-power mode and a low-power mode. As used herein, a high-power mode refers to a mode used by the storage system 100 when the storage system 100 is used to store or read data from the memory 104. In contrast, a low-power mode refers to a mode used by the storage system 100 when the storage system 100 is not used to store or read data from the memory 104. Low-power mode uses less power from the power supply of the storage system 100 than high-power mode. For example, in low-power mode, slower performance can be used to draw less power and/or certain hardware components (e.g. volatile memory) can be powered-off. It should be noted that "high" and "low" in this context are meant in a relative context (i.e., the storage system 100 uses more power in high-power mode than in low-power mode); they do not necessarily infer a particular power level.

Figure 6:
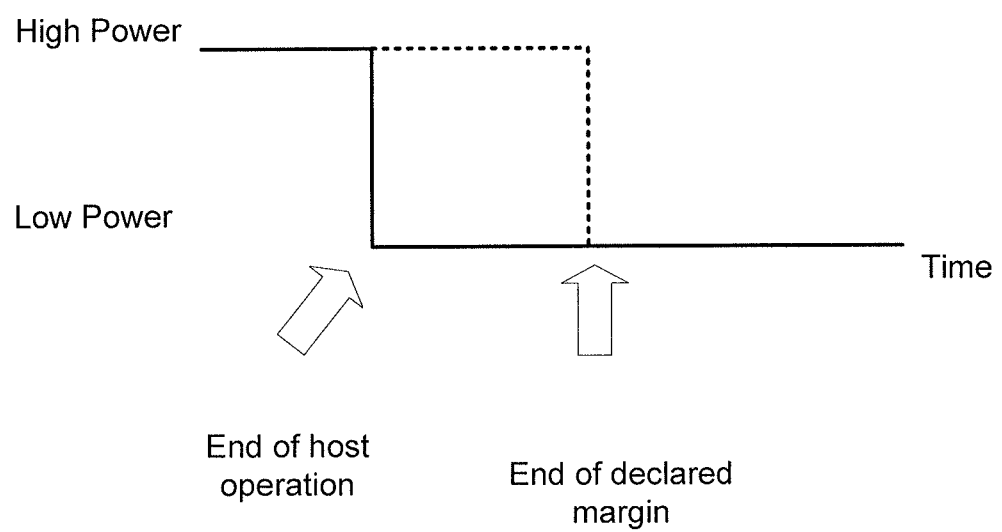
FIG. 6 is a graph showing a latency margin for a host operation of an embodiment.

As noted above, a host operation (e.g., a read, write, or erase operation) can have a predetermined completion time, and the storage system 100 is in the high-power mode to execute the operation. After the host operation is completed in the memory 104 (e.g., data is read from or written to the memory), the storage system 100 can switch to the low-power mode. In some implementations, the host can provide the storage system 100 with a power policy that specifies a certain maximum latency for staying in high-power mode after the storage system 100 completes the host operation. This is illustrated in FIG. 6, which shows that the storage system 100 is in high-power mode for a period of time after the end of the host operation. After that period of time has elapsed (i.e., at the end of the declared margin), the storage system 100 returns to the low-power mode. This margin of latency is provided over the typical latency to complete the host operation in the memory 104 to allow for any problems that might occur in executing the host operation. For example, while it might occur infrequently, it is possible for a host operation to encounter cascading errors that require time for recovery steps. By providing the margin of latency, these recovery steps can be performed while the storage system 100 is still in high-power mode. If this margin of latency were not provided, the storage system 100 would transition to low-power mode and then transition back to high-power mode, and the transitional energy cost of doing so might be very high and put strain on the power budget of the storage system.

The following embodiments are directed to performing one or more background operations in the memory 104 of the storage system 100 during this margin of latency to take advantage of the fact that the storage system 100 is still in the high-power mode (i.e., to utilize the latency margin after completing a host operation to schedule and execute a background operation, as the storage system 100 would still be in high power mode). While background operations can be performed at a later time when the host is idle, that would likely require the storage system 100 to transition from the low-power mode to the high-power mode, and, as noted above, the transitional energy for transitioning from the low-power mode to the high-power mode can be high.

However, it is possible that the host may issue another command to the storage system 100 during the latency window, and the storage system 100 would need to execute that command instead of the background operation. That means that if the storage system 100 were to start a background operation in the latency window and then receive a host command before the background operation is completed, the new host command may interrupt and preempt the background operation. This interruption/preemption can result in more power consumption than if the storage system 100 just waited to perform the background operation at a later time.

Figure 7:
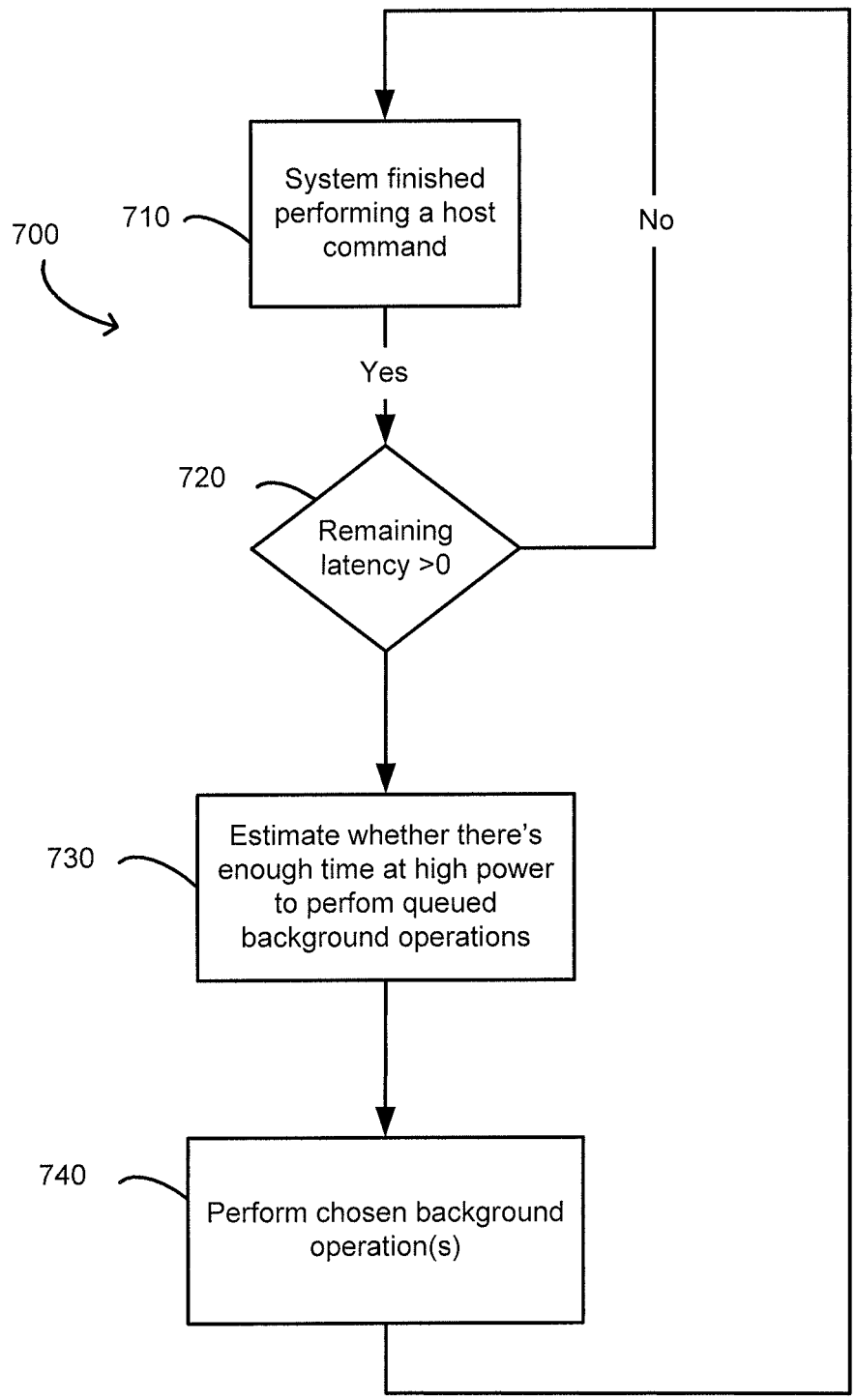
FIG. 7 is a flow chart of a method of an embodiment for utilizing high-power latency to perform background operations.

To address this issue, the following embodiments can be used by the storage system 100 to estimate whether or not there is enough time in the latency window for the storage system 100 to perform the background operation. This estimation can be based on a prediction of the likelihood that the host/user will issue another command in that window, which can be based on prior host/user behavior. FIG. 7 is a flow chart 700 of one example method that can be used.

As shown in FIG. 7, after the storage system 100 finishes performing the host command (act 710), the storage system 100 determines if there is any time remaining in the latency window (act 720). As noted above, the host can provide the storage system 100 with a power policy that specifies the period of time of the latency window. If there is a problem with executing the host operation, some or all of the time in the latency window may be used to deal with the problem.

If there is time remaining in the latency window, the storage system 100 then estimates whether there is enough time left in the latency window to perform one or more background operations, which may be queued up in the storage system 100 (e.g., according to their importance and/or length) (act 730). As will be discussed in more detail below, this estimate can be based on a prediction of the likelihood of the host sending another command in the latency window based on prior behavior by the host. If the storage system 100 estimates that there will be enough time, the storage system 100 executes a background operation (act 740). It should be noted that the estimate is just an estimate, which may be right or wrong. If the estimate is right, the storage system 100 saves power by taking advantage of the existing high-power mode to execute the background operation (instead of spending power to later transition from the low-power mode to the high-power mode to execute the background operation). Provided that the estimate is right, these embodiments provide several advantages, such as, but not limited to, overall latency reduction, better performance (through better-timed background operations and their positive impact on performance), and reduced peak-power consumption (as the power consumption of background operations will be better timed). This improves power consumption and overall read latency, which includes background operations. However, if the estimate is wrong and a host command is received in the latency window while the background operation is being executed, the storage system 100 may spend more power than it would have.

As mentioned above, any suitable technique can be used to estimate if there will be enough time for the storage system 100 to execute the background operation in the latency window. For example, the techniques described above for estimating a user's inclination to frequently overwrite data can be adapted for these embodiments to estimate remaining time in high power mode. This will now be discussed in conjunction with FIGS. 8 and 9.

Figure 8:
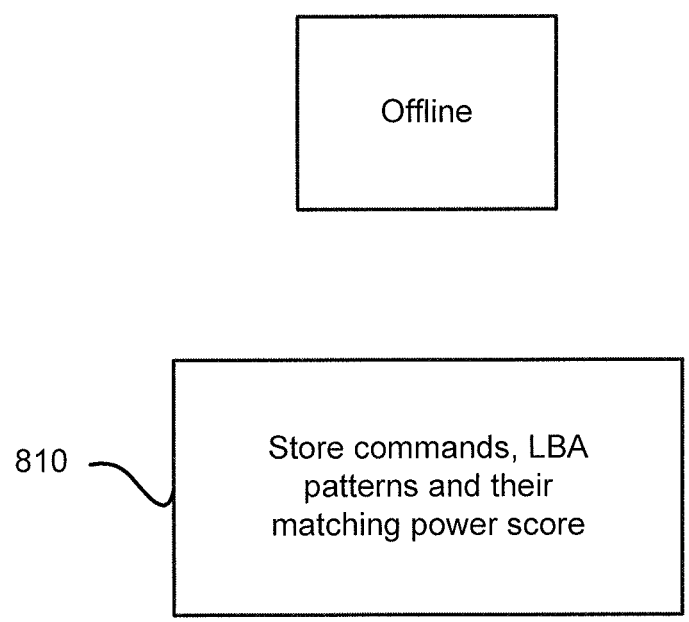
FIG. 8 is a flow chart of a method for storing patterns in a memory of an embodiment.

As shown in FIG. 8, N number of patterns corresponding to various host operation scenarios can be stored in memory 104 (or in another storage location (e.g., ROM 118) in the storage system 100) when the storage system 100 is offline (e.g., during production, but, in one embodiment, the stored pattern can be updated during the life of the storage module 100). These patterns can embody the patterns that power mode prediction may be related to (i.e., any successful classification to any of these patterns will result in power mode prediction). For example, a number of patterns of host operations (e.g., write and/or read), along with their associated logical block addresses (LBAs) or LBA ranges, can be stored, along with their matching power scores, in the storage system 100 (act 810). For each pattern, the matching power score can indicate if and when another host command was received in the latency window following that pattern. The algorithm can classify several set classes of power usage or do a regression, where it predicts a power figure that is considered as the power that will be drawn from the power supply by the host. These patterns can consist of the commands the user passed and the LBAs (or LBA ranges) that the user is expected to be writing.

The LBA write history and the commands passed by the user can be recorded and matched against each of the stored patterns. In general, for each of the stored patterns, a score that represents the pattern's matching to the user write history can be generated. Eventually, the results can be aggregated, and an evaluated time at high power mode can be produced. A "soft" measure representing the pattern's matching to the user history can also be generated and used in the high power time evaluation. For example, one of the patterns can embody writing with high frequency over the same small range of LBAs. In such case, the storage system 100 can conclude that the user will remain in high power mode during the mentioned "excess margin" and, thus, that a background operation can be performed during that time.

Figure 9:
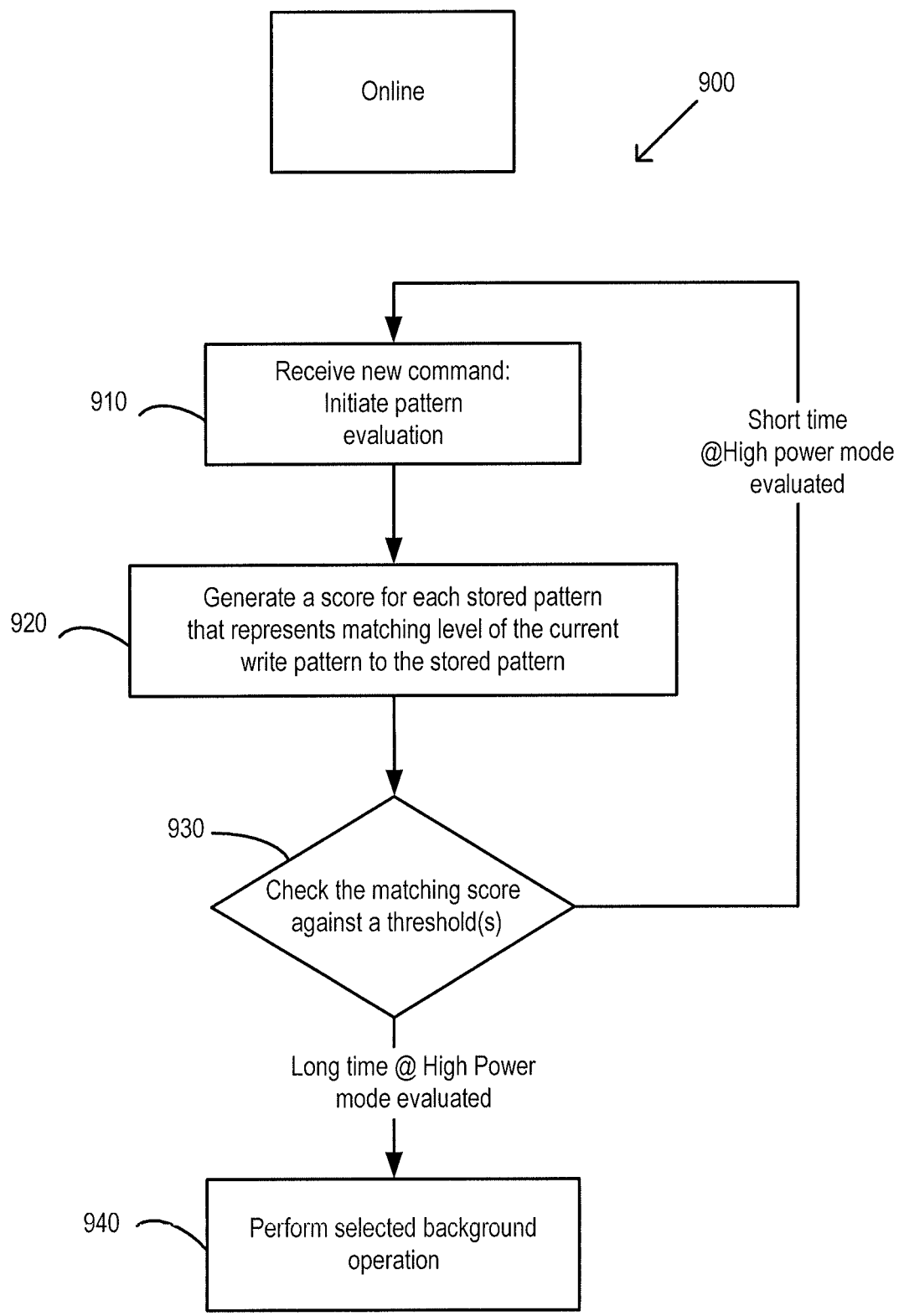
FIG. 9 is a flow chart of a method of an embodiment for adaptive scheduling of background operations by comparing commands and logical block addresses against stored command and logical block address patterns.

FIG. 9 depicts the process of LBA matching against the stored patterns, in which the storage system 100 uses the stored patterns to determine whether or not to execute a background operation in the latency window. As shown in FIG. 9, when the storage system 100 is in use with a host ("online"), the storage system 100 receives a new command from the host and initiates a pattern evaluation based on that command and/or previous commands received by the storage system 100 (act 910). To do this, the storage system 100 can generate a score for each stored pattern that represents a matching level of the current write pattern to the stored pattern (act 920). The storage system 100 can then check the matching score against one or more thresholds (act 930). If the storage system 100 determines that pattern matching suggests that it is likely that there will not be enough time to execute the background operation ("Short time@High power mode evaluated"), the storage system 100 will not perform the background operation. However, if the storage system 100 determines that pattern matching suggests that it is likely that there will be enough time to execute the background operation ("Long time@High power mode evaluated"), the storage system 100 will perform the selected background operation (act 940).

It should be noted that the above algorithm was just an example, and other algorithms and methods can be used. For example, in addition to or as an alternative to the matching process discussed above, which can be performed using simple computational logic, a "soft" measure, which can represent the pattern's matching to the user history, can be generated and used, for example, by predicting of usage behavior using machine learning. In this alternative, a machine learning algorithm can be used for learning the user's access patterns and, accordingly, make the decision as to whether or not to perform the background operation in the latency window. The pattern recognition may be performed using a support vector machine (SVM) classification, a neural network, a recurring neural network, or other clustering methods, such as K-Means and/or the principal component analysis (PCA) method. Supervised (pre-calibrated) or unsupervised learning algorithms can be used (i.e., the training/calibration of the algorithm can be done with or without a labeled dataset that includes ground truth labels of relevant training examples (or even without pre-training/calibration of the model, where classifying is done directly (adaptive learning) during the life time of the device). Further, instead of the storage system 100 doing the predicting, the host can do the predicating and send an indication of the results to the storage system 100.

There are many alternatives that can be used with these embodiments. For example, in one alternate embodiment, the results of the high-power-mode estimation using one of the algorithms discussed above may be used to estimate whether the high power mode may resume without the context of the currently-completed host operation. For example, an integrated memory device may estimate whether the device is connected to an external power supply. In such case, there may be less restriction on the power that the background operations require.

In yet another alternative, a storage system and method for efficient pipeline gap utilization for background (management) operations are provided. As noted above, it is desired to perform a background operation when the storage system is still in high-power mode instead of waiting until a later time when the storage system is in a low-power mode, which may require energy to transition from the low-power mode back to the high-power mode to perform the operation. Some of the above embodiments accomplished this by performing a background operation in the idle period after host operations have been performed but before the storage system 100 switches to the low-power mode. This idle period is sometimes referred to herein as the "background operations time-out" ("BKOPS TO") period. In the following embodiments, instead of waiting until the idle time, one or more background operations are performed in between host operations. More specifically, host operations are performed in a pipeline manner in various hardware stages of the controller, and the background operations are performed in the "gaps" of the pipeline when certain hardware stages are temporality free and awaiting the next host operation. This embodiment will be discussed in more detail below.

Figure 10:
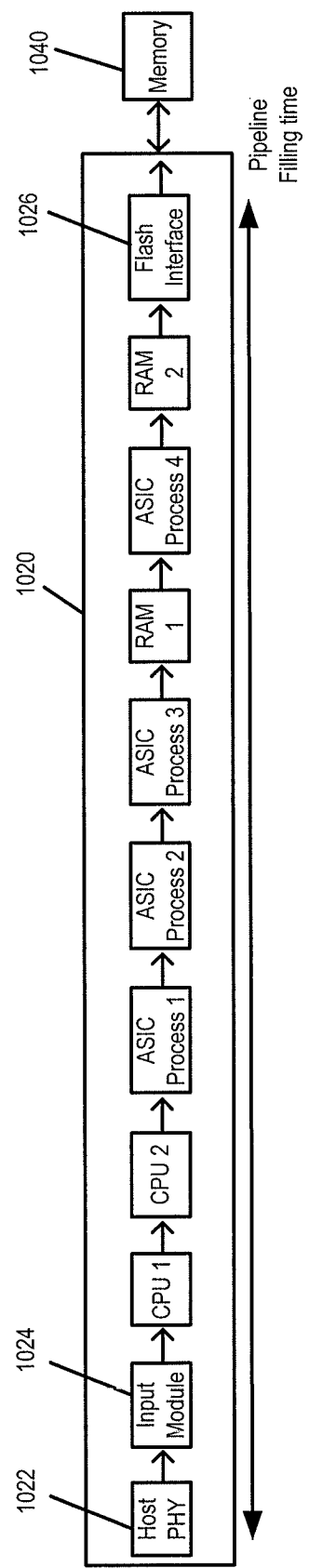
FIG. 10 is an illustration of a plurality of hardware stages of a controller of an embodiment.

Turning again to the drawings, FIG. 10 is an illustration of a controller 1020 of an embodiment. As shown in FIG. 10, the controller 1020 in this embodiment comprises a plurality of hardware stages controlled and managed by firmware/ software in the controller 1020. In this particular example, the hardware stages comprise a physical layer interface (PHY) 1022, an input module 1024, central processing unit (CPU) 1, CPU 2, application-specific integrated circuit (ASIC) process 1, ASIC process 2, ASIC process 3, RAM 1, ASIC process 4, RAM 2, and a flash interface 1026. It should be noted that these hardware stages are just examples, and other or different hardware stages can be used. The controller 1020 is in communication with a memory 1040 and a host (not shown).

When a host operation is received by the controller 1020, it is processed in a serial manner in the hardware stages. In this particular example (again, other implementations are possible), a host command is received by the PHY 1022 and then is passed to the input module 1024. The input module 1024 checks the integrity of the command and generates metadata for the command. Next, CPU 1 performs logical-to-physical address translation and schedules the command. After that, CPU 2 performs various data path tasks and breaks down the command into smaller transactions. ASIC process 1 then performs error correction code generation, and ASIC process 2 builds the individual transactions to be performed, storing them in RAM 1. ASIC process 4 acts as an accelerator and can perform additional processing steps, storing the result in RAM 2. The commands and data are then sent to the flash interface 1026, where they are transferred to memory 1040. Each of these stages is associated with a typical execution time, some deterministic (e.g., command interpretation, error correction code (ECC) encoding, etc.) and some with variable length (read from memory, ECC decoding, etc.).

In this embodiment, the controller 1020 can perform a plurality of host operations in a pipeline manner using the plurality of hardware stages. That is, different hardware stages work in parallel in the pipeline, such that while one hardware stage executes a first host command, the next host command is already being processed in another hardware stage of the controller 1020. Accordingly, even though a first host operation may be using some hardware stages in the controller 1020, the controller 1020 can use the hardware stages no longer being used by the first host operation to begin processing the second host operation. For example, if the first host operation is at the ASIC process 3 stage in the pipeline, the controller 1020 can accept the second host operation at the host PHY 1022, then pass it to the input module 1024, etc. This provides a more efficient use of resources than waiting until the controller 1020 is completely done processing the first host operation before starting the second host operation.

In many situations, even with such pipeline processing of host operations, there may be hardware stages that are not being used at a given point in time, such as in the example above where the first host operation is at the ASIC process 3 stage in the pipeline when the second host operation is at the host PHY 1022. The intervening hardware stages are idle, thereby creating "gaps" in the pipeline. Gaps may also be created if one or more of the hardware stages takes more time to process than another.

The above description was directed to a host operation. A background operation would also be processed in a pipeline manner, but a background operation only requires a subset of the hardware stages. For example, because a background operation is typically generated by the controller 1020, a background operation would not use the PHY 1022 or the input module 1024. In one implementation, a background operation only uses ASIC process 4, RAM 2, and the flash interface 1026.

This embodiment takes advantage of the fact that a background operation only uses a subset of hardware stages to utilize vacancies in the pipeline to process background operations. For example, if the first host operation is at the RAM 2 stage, and the second host operation is at the host PHY 1022 stage, the intervening hardware stages are empty. Knowing that there is an amount of time before the second host operation reaches the ASIC process 4 stage, the controller 1020 can dynamically schedule and execute one or more background operations in the gaps of the pipeline.

Figure 11:
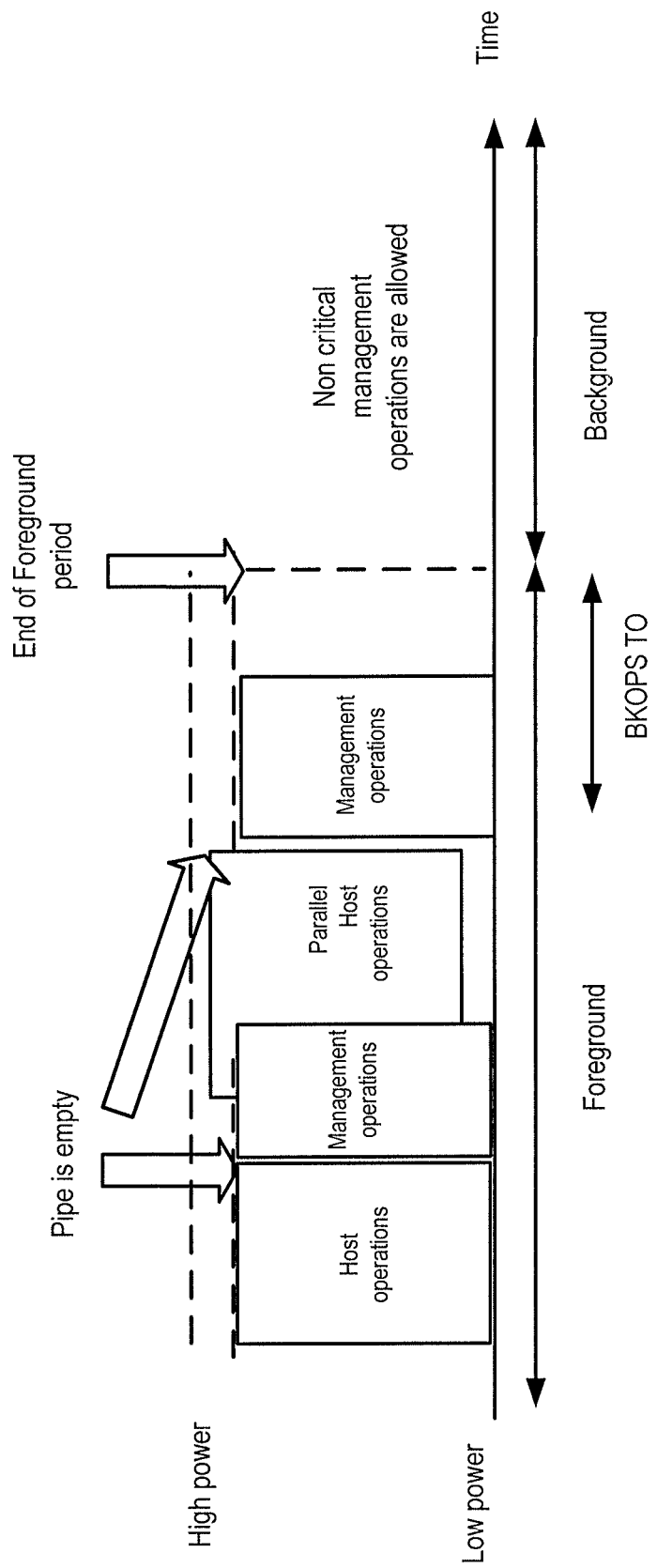
FIG. 11 is a graph illustrating performance of a background operation of an embodiment.

The process above is shown diagrammatically in FIG. 11. As shown in FIG. 11, a background (management) operation is performed during the high-power mode before the first host operation is completed but after the second operation has started. As discussed above, in this embodiment, the background operation is performed in the unused hardware stages that are waiting to be filled by the second host operation. As also shown in FIG. 11, a background operation can instead or additionally be performed after the pipeline is empty in the background operation time-out (BKOPS TO) (or idle) period, as discussed above and below. That is, background operations can be scheduled once the pipeline is empty, well ahead of the BKOPS TO. In one embodiment, a typical value for the pipeline to free up is tens of microseconds, while the typical value of BKOPS TO is tens of milliseconds. This scheduling can significantly reduce background activity, allowing the storage system to quickly move to low-power mode.

Because the background operation is being performing in between host operations in the pipeline, the background operation is being performed while the storage system is still in high-power mode, which avoids the need and cost of later transitioning from low-power mode to high-power mode to perform the background operation. Also, as compared to waiting until the idle period to perform the background operation, this embodiment does not need to make an educated guess as to whether there will be enough time to perform the background operation, as the time available between hardware stages is known. That is, these embodiments do not necessarily need to be concerned with scheduling background operations in the background; rather, this embodiment can schedule background operations in the foreground.

With this embodiment, background operations can be classified into different groups based on their latency and stages of pipeline that they employ. Also, each background operation can be classified as either suspendable (such as triple-level cell (TLC) write and erase) or atomic (such as operations that use the ECC hardware engine). The breakdown of non-atomic operations may also be performed in this stage. For example, read threshold calibration can be done by performing several read operations and then executing a hardware operation using those pages. This calibration can be broken down into segments, and the reads can be executed independently, prior to the hardware operation. Execution of host operations should not interfere with the collection of the information needed for read threshold calibration.

Figure 12:
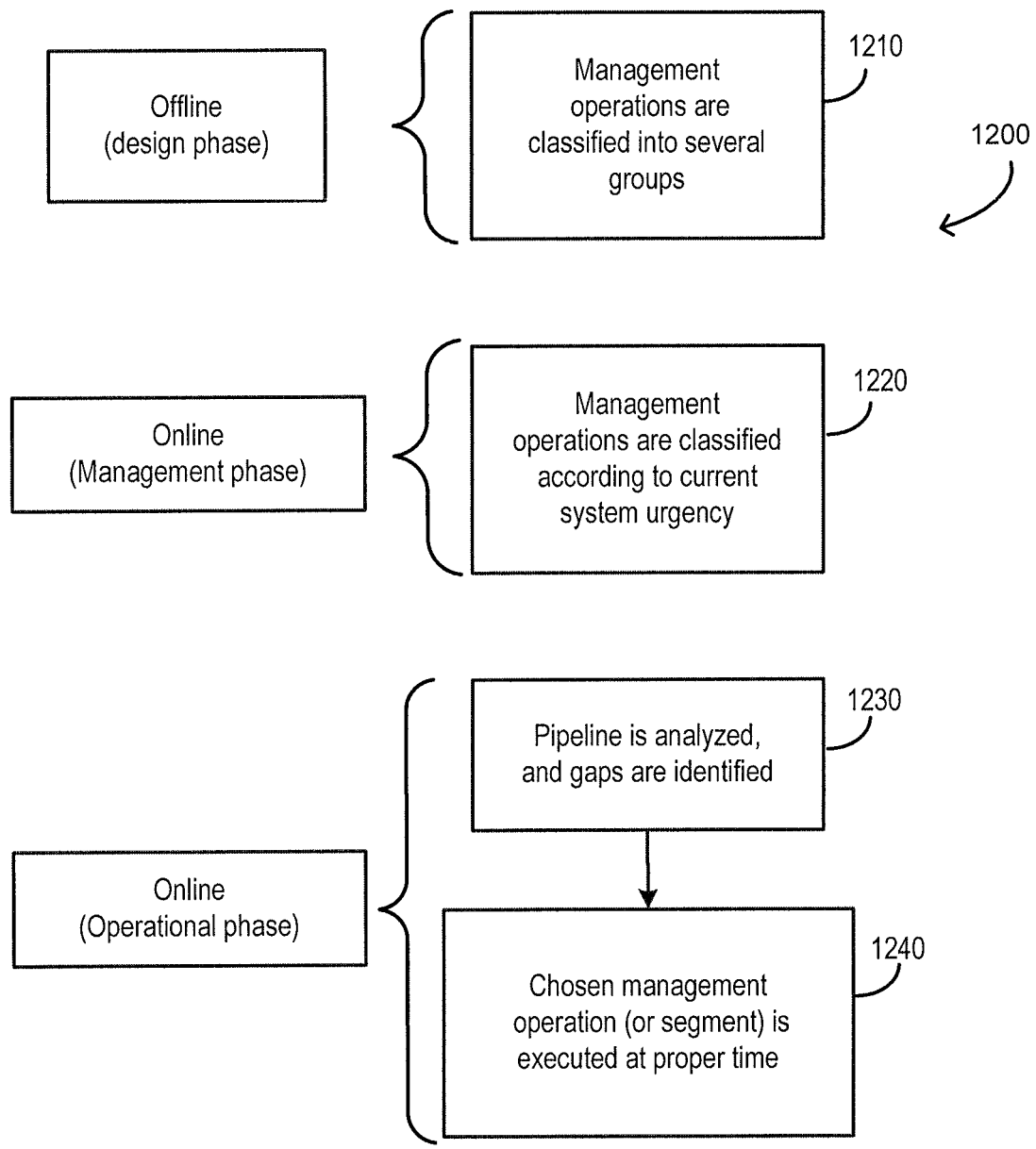
FIG. 12 is a flow chart of a method of an embodiment for performing a background operation.

A second-tier classification may involve the urgency of the background operations. A central system can arbitrate the different management operations considering their classification, urgency and the state of the pipeline. That is, given that the time available between hardware stages is known, the controller 1020 can select which among a plurality of background operations to perform. This will now be discussed in reference to FIG. 12. As shown in FIG. 12, when the storage system is offline (e.g., in a design phase), background (management) operations can be classified into several groups (e.g., based on at least one of the following: latency time, hardware stages needed, and whether the background operation is suspendable or atomic) (act 1210). When the storage system is on-line, the background operations can be classified according to system urgency (act 1220). For example, if high bit-error rate (BER) is measured for certain blocks, read threshold calibration of a time tag to which those blocks are allocated may receive a higher urgency. As another example, read scrub or relocation from single-level cell (SLC) memory to triple-level cell (TLC) memory can differ in its urgency depending on the storage system's program/erase (P/E) cycles and remaining capacity.

When the storage system is on-line and in an operational phase, the controller 1020 can analyze the pipeline to identify gaps (act 1230) and choose a background operation (or a segment of background operation) to execute at the proper time (act 1240). If the storage system has yet to pass the BKOPS TO period (see FIG. 11), shorter background operations can be preferred, while longer background operations may be preferred once the storage system has passed the BKOPS TO period. This can help maintain similar behavior to previously-used systems and allow stalling the host operation in favor of the background operation after BKOPS TO has passed, if it is needed.

There are several advantages associated with these embodiments. For example, as the QoS (Quality of Service) requirements from storage system controllers become stricter, creative solutions are needed to improve latency specifications. These embodiments improve the throughput and QoS of storage system by performing more management operations, which results in efficient operation and less stalls. In turn, the storage system can reduce the amount of background and critical-foreground operations, ultimately leading to better overall performance by using free slots in the controller's hardware pipeline to perform background operations. This can improve battery life. In one example implementation, this embodiment can reduce the daily power consumption of the storage system by more than 10%.

Figure 13:
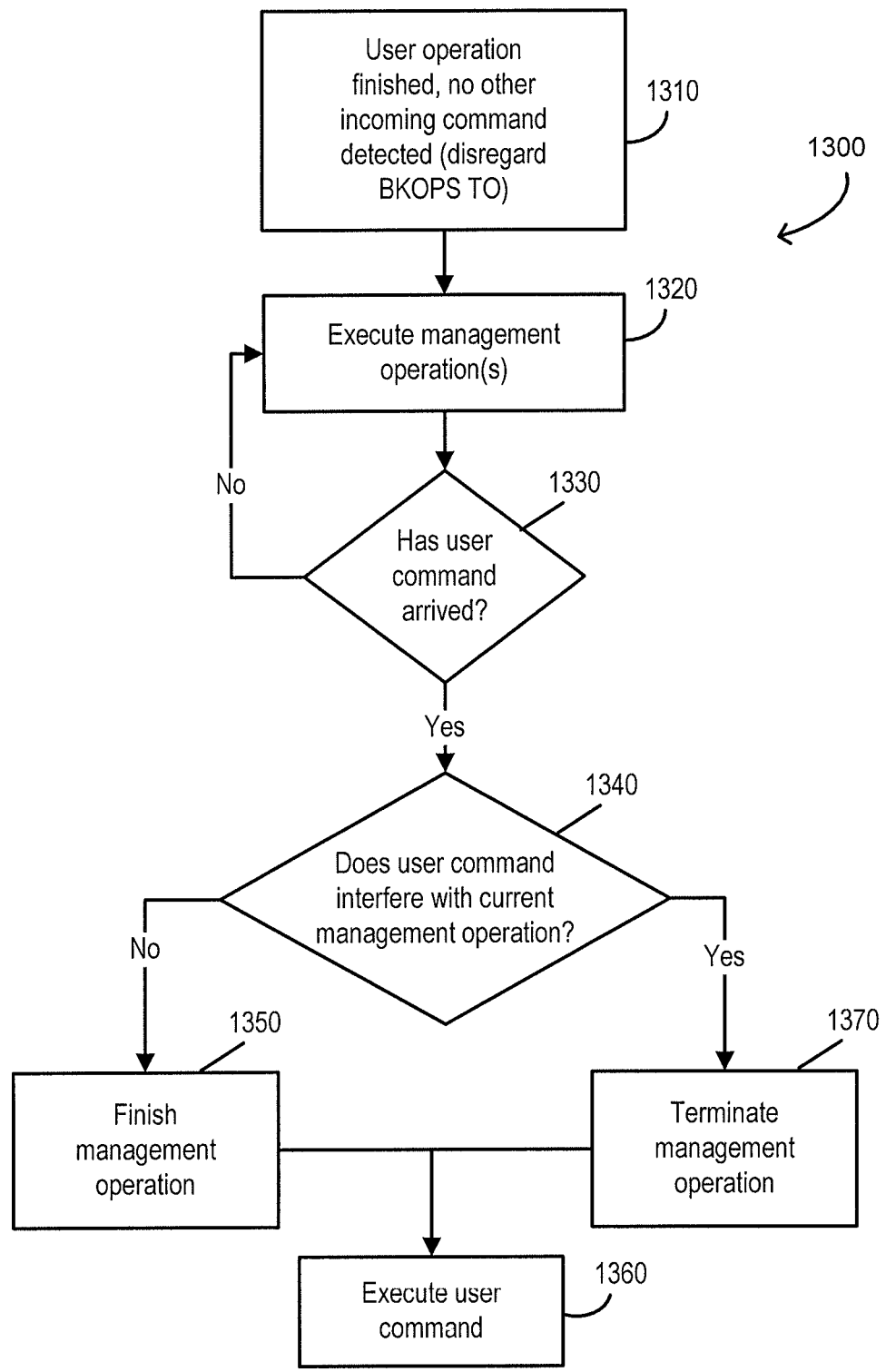
FIG. 13 is a flow chart of a method of an embodiment for performing a background operation.

There are many alternatives that can be used with these embodiments. For example, instead of performing a background operation in between host operations in the pipeline, the controller 1020 can wait until the pipeline is empty before starting a background operation. This alternative is shown in the flow chart 1300 of FIG. 13. As shown in FIG. 13, after a host (user) operation is finished, the controller 1020 detects no other incoming commands (act 1310). The controller 1020 then begins executing one or more background (management) operations (act 1320). If the controller 1020 receives a host (user) command (act 1330), the controller 1020 determines if the host command interferes with the current background command (act 1340). If it does not, the controller 1020 finishes the background operation (act 1350) and then executes the host command (act 1360). Otherwise, the controller 1020 terminates the background operation (act 1370) and resume that operation later.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention.

Finally, it should be noted that any aspect of any of the embodiments described herein can be used alone or in combination with one another.

What is claimed is:

1. A method for performing a background operation, the method comprising:
    performing, in a controller of a storage system, first and second host operations in a pipeline manner using a plurality of hardware stages defined within the controller wherein:
        the storage system is in communication with a host, and
        the plurality of hardware stages includes a first hardware stage, a second hardware stage, and a third hardware stage; and
    performing, in the controller, a background operation using the second hardware stage after the first host operation finishes using the second hardware stage but before the second host operation uses the second hardware stage, wherein the background operation is completed using a portion of the plurality of hardware stages.

2. The method of claim 1, wherein the background operation is performed using the second hardware stage when the first hardware stage is being used to perform the second host operation.

3. The method of claim 1 further comprising selecting the background operation from a plurality of background operations.

4. The method of claim 3, wherein the selection is based on at least one of the following: latency time, hardware stages needed, and whether the background operation is suspendable or atomic.

5. The method of claim 1, wherein the storage system further comprises a three-dimensional memory in communication with the controller.

6. The method of claim 1, wherein the storage system is embedded in the host.

7. The method of claim 1, wherein the storage system is removably connected to the host.

8. A storage system comprising:
    a memory; and
    a controller comprising a plurality of hardware stages including a first hardware stage, a second hardware stage, and a third hardware stage, wherein the controller is configured to,
        operate, during a first period of time, the storage system in a high power mode;
        perform, during the first period of time, a plurality of host operations and a background operation, wherein the background operation is completed using a portion of the plurality of hardware stages; and
        operate, during a second period of time, the storage system in a low-power mode.

9. The storage system of claim 8, wherein the controller is further configured to:
    perform the background operation using only the second hardware stage, and
    use the second hardware stage to perform the background operation after a first one of the plurality of host operations finishes using the second hardware stage but before a second one of the plurality of host operations uses the second hardware stage.

10. The storage system of claim 9, wherein the controller is further configured to:
    perform the background operation using the second hardware stage during a subset of the first period of time, and perform the second one of the plurality of host operations, using the first hardware during the subset of the first period of time.

11. The storage system of claim 8, wherein the controller is further configured to select the background operation from a plurality of background operations.

12. The storage system of claim 11, wherein the selection is based on at least one of the following: latency time, hardware stages needed, and whether the background operation is suspendable or atomic.

13. The storage system of claim 8, wherein the memory comprises a three-dimensional memory.

14. The storage system of claim 8, wherein the storage system is embedded in a host.

15. The storage system of claim 8, wherein the storage system is removably connected to a host.

16. A storage system comprising:
a memory;
means for performing first and second host operations in a pipeline manner using a plurality of hardware stages defined within a controller, the hardware stages including a first hardware stage, a second hardware stage, and a third hardware stage,
wherein the storage system is operated in a high power mode when performing first and second host operations, and,
wherein the storage system remains in the high power mode for a period of time following completion of the second host operation, after which the storage system enters a low-power mode; and
means for performing a background operation using the second hardware stage after the first host operation finishes using the second hardware stage but before the second host operation uses the second hardware stage,
wherein the background operation is performed when the storage system is in the high power mode before the second host operation finishes and
wherein the background operation is completed using a portion of the plurality of hardware stages.

17. The storage system of claim 16 further comprising means for selecting the background operation from a plurality of background operations based on at least one of the following: latency time, hardware stages needed, and whether the background operation is suspendable or atomic.

18. The storage system of claim 16, wherein the memory comprises a three-dimensional memory.

19. The storage system of claim 16, wherein the storage system is embedded in a host.

20. The storage system of claim 16, wherein the storage system is removably connected to a host.

* * * * *